US011567230B1

(12) United States Patent
Song et al.

(10) Patent No.: US 11,567,230 B1
(45) Date of Patent: Jan. 31, 2023

(54) DIRECTION-FINDING AND POSITIONING SYSTEM OF ELECTROMAGNETIC EMISSION OF COAL OR ROCK FRACTURE

(71) Applicant: University of Science and Technology Beijing, Beijing (CN)

(72) Inventors: Dazhao Song, Beijing (CN); Xueqiu He, Beijing (CN); Menghan Wei, Beijing (CN)

(73) Assignee: UNIVERSITY OF SCIENCE AND TECHNOLOGY BEIJING, Beijing (CN)

(*) Notice: Subject to any disclaimer, the term of this patent is extended or adjusted under 35 U.S.C. 154(b) by 0 days.

(21) Appl. No.: 17/679,137

(22) Filed: Feb. 24, 2022

(30) Foreign Application Priority Data

Sep. 3, 2021 (CN) .......................... 202111029429.X

(51) Int. Cl.
*G01V 3/12* (2006.01)
*G01V 3/38* (2006.01)
*G01V 3/165* (2006.01)

(52) U.S. Cl.
CPC ................ *G01V 3/12* (2013.01); *G01V 3/165* (2013.01); *G01V 3/38* (2013.01)

(58) Field of Classification Search
CPC . G01V 3/12; G01V 3/165; G01V 3/38; G01V 3/08; G01V 3/082; G01S 5/04
(Continued)

(56) References Cited

U.S. PATENT DOCUMENTS 8,347,658 B2 * 1/2013 Thompson .............. G16Z 99/00
702/14
8,478,533 B2 * 7/2013 Thompson .............. E21B 43/00
702/14
(Continued)

FOREIGN PATENT DOCUMENTS

CA 2877147 A1 * 1/2014 ........... E21B 43/267
CN 103995296 A * 8/2014
(Continued)

OTHER PUBLICATIONS

Di et al., Rock Burst Precursor Electromagnetic Radiation Signal Recognition Method and Early Warning Application Based on Recurrent Neural Networks, Rock Mechanics and Rock Engineering (2021) 54:1449-1461 (Year: 2021).*
(Continued)

*Primary Examiner* — Patrick Assouad
*Assistant Examiner* — Sean Curtis
(74) *Attorney, Agent, or Firm* — Bayramoglu Law Offices LLC

(57) ABSTRACT

A direction-finding and positioning system of electromagnetic emission of coal or rock fracture includes a three-axis electromagnetic sensor array, a signal acquisition module and a direction-finding and positioning terminal; the three-axis electromagnetic sensor array is composed of at least four three-axis electromagnetic sensors configured to synchronously sense magnetic field strength in three-axis direction based on a tunnel magneto resistance technology, and obtain a real magnetic field vector in space by measuring; the signal acquisition module is configured to acquire magnetic field vector variable information of multiple measuring points in real-time, and after extracting magnetic field vector variable parameters, transmitting the magnetic field vector variable parameters to the direction-finding and positioning terminal; the direction-finding and positioning terminal is
(Continued)

configured to perform direction-finding and positioning calculations according to the magnetic field vector variable parameters received, and performing a three-dimensional dynamic visual display to positioning results, positioning time, and positioning coordinates.

5 Claims, 3 Drawing Sheets

(58) Field of Classification Search
USPC .......................................................... 324/357
See application file for complete search history.

(56) References Cited

U.S. PATENT DOCUMENTS

| | | | | |
|---|---|---|---|---|
| 8,494,776 B2* | 7/2013 | Thompson | ............... | G16Z 99/00 702/14 |
| 8,560,241 B2* | 10/2013 | Thompson | ............... | G01V 3/16 702/11 |
| 8,566,036 B2* | 10/2013 | Thompson | ............... | E21B 43/16 702/14 |
| 8,566,037 B2* | 10/2013 | Thompson | ............... | G01V 3/16 702/14 |
| 8,589,079 B2* | 11/2013 | Thompson | ............... | G01V 3/12 702/14 |
| 8,633,700 B1* | 1/2014 | England | ............... | G01V 11/007 324/348 |
| 9,239,396 B2* | 1/2016 | Thompson | ............... | E21B 49/00 |
| 9,239,397 B2* | 1/2016 | Thompson | ............... | G01V 1/20 |
| 9,377,552 B2* | 6/2016 | Hoversten | ............... | G01V 3/083 |
| 9,599,750 B2* | 3/2017 | Thompson | ............... | E21B 49/00 |
| 9,606,257 B2* | 3/2017 | Wu | ............... | G01V 3/28 |
| 10,378,316 B2* | 8/2019 | Thompson | ............... | G01V 3/16 |
| 10,620,338 B2* | 4/2020 | Thompson | ............... | G01V 1/306 |
| 10,739,494 B2* | 8/2020 | Thompson | ............... | G01V 1/306 |
| 10,884,154 B2* | 1/2021 | Li | ............... | E21F 17/18 |
| 11,043,101 B2* | 6/2021 | He | ............... | E21F 17/18 |
| 11,397,236 B2* | 7/2022 | Song | ............... | G01V 3/12 |
| 2012/0253680 A1* | 10/2012 | Thompson | ............... | G01V 11/007 73/152.16 |
| 2013/0066561 A1* | 3/2013 | Thompson | ............... | G16Z 99/00 702/13 |
| 2013/0069654 A1* | 3/2013 | Thompson | ............... | G01V 3/12 324/334 |
| 2013/0070562 A1* | 3/2013 | Thompson | ............... | G01V 3/38 367/38 |
| 2013/0073210 A1* | 3/2013 | Thompson | ............... | E21B 43/00 702/11 |
| 2013/0119993 A1* | 5/2013 | Thompson | ............... | E21B 43/16 324/330 |
| 2013/0133880 A1* | 5/2013 | Thompson | ............... | E21B 43/16 324/334 |
| 2014/0039796 A1* | 2/2014 | Thompson | ............... | G01V 3/12 324/334 |
| 2014/0239956 A1* | 8/2014 | Hoversten | ............... | G01V 3/12 324/334 |
| 2019/0277942 A1* | 9/2019 | Song | ............... | G01V 3/38 |
| 2019/0360312 A1* | 11/2019 | Thompson | ............... | G01V 11/007 |
| 2020/0033496 A1* | 1/2020 | Li | ............... | G01N 27/725 |
| 2021/0134135 A1* | 5/2021 | He | ............... | G08B 31/00 |

FOREIGN PATENT DOCUMENTS

| | | | | | |
|---|---|---|---|---|---|
| CN | 104267442 | A | * | 1/2015 | |
| CN | 105807256 | A | | 7/2016 | |
| CN | 105807256 | A | * | 7/2016 | |
| CN | 106054266 | A | * | 10/2016 | ............... G01V 3/12 |
| CN | 106321149 | A | | 1/2017 | |
| CN | 106054266 | B | * | 2/2018 | ............... G01V 3/12 |
| CN | 107728218 | A | * | 2/2018 | ............... G01V 3/12 |
| CN | 106321149 | B | * | 3/2018 | |
| CN | 107843642 | A | | 3/2018 | |
| CN | 107843874 | A | | 3/2018 | |
| CN | 107843874 | A | * | 3/2018 | ............... G01S 5/04 |
| CN | 108169797 | A | * | 6/2018 | ............... G01V 3/08 |
| CN | 108169797 | A | | 6/2018 | |
| CN | 107728218 | B | * | 4/2019 | ............... G01V 3/12 |
| CN | 211652376 | U | * | 10/2020 | |
| CN | 112415615 | A | * | 2/2021 | |
| CN | 113466948 | A | * | 10/2021 | |
| CN | 113466948 | B | * | 12/2021 | |
| CN | 113985485 | A | * | 1/2022 | |
| CN | 215579086 | U | * | 1/2022 | |
| EP | 2506041 | A1 | * | 10/2012 | ......... E21B 41/0092 |
| EP | 3543748 | A1 | * | 9/2019 | |
| WO | 03042718 | A1 | | 5/2003 | |
| WO | WO-2013191748 | A1 | * | 12/2013 | ............. E21B 43/26 |
| WO | WO-2014133607 | A1 | * | 9/2014 | ............. G01V 3/083 |
| WO | WO-2014137429 | A1 | * | 9/2014 | ........... G01V 11/007 |
| WO | WO-2019085384 | A1 | * | 5/2019 | ............... G01S 5/04 |

OTHER PUBLICATIONS

Qiu et al., Early-warning of rock burst in coal mine by low-frequency electromagnetic radiation. Engineering Geology 279 (2020) 105755 © 2020 Elsevier B.V. (Year: 2020).*

Li et al., Rock Burst Monitoring by Integrated Microseismic and Electromagnetic Radiation Methods. Rock Meeh Rock Eng (2016) 49:4393-4406 (Year: 2016).*

Song et al., Study on the characteristics of coal rock electromagnetic radiation (EMR) and the main influencing factors. Journal of Applied Geophysics 148 (2018) 216-225. © 2017 Elsevier B.V. (Year: 2017).*

Liu Yang, et al., Research on time-frequency characteristics of acoustic-electric signals in process of rock failure under load, Industry and Mine Automation, 2020, pp. 87-91, vol. 46, No. 6.

Qian Jian-Sheng, et al., Analysis of electromagnetic wave's propagating characteristic process of coal rock butbursts, Journal of China Coal Society, 1999, pp. 392-394, vol. 24, No. 4.

* cited by examiner

DIRECTION-FINDING AND POSITIONING SYSTEM OF ELECTROMAGNETIC EMISSION OF COAL OR ROCK FRACTURE

CROSS-REFERENCE TO RELATED APPLICATIONS

This application is based upon and claims priority to Chinese Patent Application No. 202111029429.X, filed on Sep. 3, 2021, the entire contents of which are incorporated herein by reference.

TECHNICAL FIELD

The present disclosure relates to the technical field of coal or rock dynamic disaster prevention, in particular to a direction-finding and positioning system of electromagnetic emission of coal or rock fracture.

BACKGROUND

Coal mining conditions are complex in our country, and coal or rock dynamic disasters are one of the main disasters in coal mines. As mining depth continues to increase, frequency, intensity and damage of coal or rock dynamic disasters are all on the rise, and the number of occurrences and the number of casualties are also on the rise. Electromagnetic emission generated by deformation and fracture of coal is a relatively common physical phenomenon. As a very promising geophysical method, electromagnetic emission method has achieved considerable results in recent years in generation mechanism of electromagnetic emission of coal or rock fracture, signal characteristics, prediction of the application status of coal or rock dynamic disasters, and influencing factors and the other aspects.

At present, coal or rock electromagnetic emission technology mainly realizes the monitoring and early warning of rock-burst disasters by analyzing time series of electromagnetic precursor signals.

SUMMARY

A direction-finding and positioning system of electromagnetic emission of coal or rock fracture, wherein comprising a three-axis electromagnetic sensor array, a signal acquisition module and a direction-finding and positioning terminal;

the three-axis electromagnetic sensor array is composed of at least four three-axis electromagnetic sensors, which are configured to synchronously sense magnetic field strength in three-axis direction based on a tunnel magneto resistance technology, and obtain a real magnetic field vector in space by measuring;

the signal acquisition module is configured to acquire magnetic field vector variable information of multiple measuring points in real-time, and after extracting magnetic field vector variable parameters, transmitting the magnetic field vector variable parameters to the direction-finding and positioning terminal;

the direction-finding and positioning terminal is configured to perform direction-finding and positioning calculations according to the magnetic field vector variable parameters that received, and performing a three-dimensional dynamic visual display to positioning results, positioning time, and positioning coordinates.

In some embodiments, the three-axis electromagnetic sensor comprises an auxiliary power source circuit, a three-axis sensing module, a waveform conditioning module, and an output circuit that are connected sequentially, the auxiliary power source circuit is connected to a power supply port, and the output circuit is connected to an axial output channel of the x-axis, y-axis, and z-axis respectively.

In some embodiments, the three-axis sensing module is composed of three micro-magnetic sensing chips arranged orthogonally through imposing by PCB patch, the micro-magnetic sensing chip senses the magnetic field intensity components on the x-axis, y-axis, and z-axis based on the tunnel magneto resistance effect of magnetic multilayer film material, and a voltage signal conversion is realized directly through a push-pull Wheatstone bridge circuit.

In some embodiments, the waveform conditioning module is configured to amplify signals of effective frequency bands, and filter signals of other frequency bands, a bandwidth of filter is from 200 Hz to 300 kHz.

In some embodiments, external structure of the three-axis electromagnetic sensor comprises a power supply and output end and an encapsulation shell, and the power supply and output end comprises a single-ended output type and an aerial plug-in type of two forms, the encapsulation shell is made of high-strength engineering plastics, and the encapsulation shell is inlaid with a spirit level and a compass.

In some embodiments, the power supply and output end of single-ended output type three-axis electromagnetic sensor comprises a power source interface and an x-axis signal output interface, a y-axis signal output interface, and a z-axis signal output interface, the power source interface and the x-axis signal output interface, the y-axis signal output interface, and the z-axis signal output interfaces are all configured to adopt SMA interface, four pins are connected independently, and the range of linear output voltage is ±2.5 V.

In some embodiments, the power supply and output end of the aerial plug-in type three-axis electromagnetic sensor comprises eight pins, one is connected to a power source, one is grounded, and remaining six pins output x-axis, y-axis and z-axis signals differentially, and the output range of each differential line is from 0 to 4.096 V.

In some embodiments, the signal acquisition module comprises a multi-channel acquisition instrument and a controller;

the multi-channel acquisition instrument is configured to acquire the magnetic field vector change information of multiple measuring points in real-time, and transmitting acquisition data to the controller via WIFI wirelessly;

the controller is configured to control acquisition process and store data, and transmit magnetic field vector variable parameters to the direction-finding and positioning terminal after extracting the magnetic field vector variable parameters.

In some embodiments, the direction-finding and positioning terminal performs direction-finding and positioning calculations through the following steps:

step 1, establishing an unified Cartesian coordinate system, coordinate axis is parallel to test axis of each three-axis electromagnetic sensor, and correcting the corresponding relationship respectively between positive direction of each axis of the three-axis electromagnetic sensor and positive direction of the coordinate axis;

step 2, for the i-th three-axis electromagnetic sensor in the three-axis electromagnetic sensor array, constructing a space vector $n_{ix}$, $n_{iy}$, $n_{iz}$ along planes of the three coordinate axis according to spatial position of measuring point where it is located, and constructing a feature vector according to a set of magnetic field vector variable parameters ($A_x$, $A_y$, $A_z$) extracted;

step 3, calculating three azimuth angles $\alpha$, $\beta$, $\gamma$ of the magnetic field vector at the position of the i-th third three-axis electromagnetic sensor:

$$\alpha = \arccos\frac{H_i \cdot n_{ix}}{|H_i||n_{ix}|}, \beta = \arccos\frac{H_i \cdot n_{iy}}{|H_i||n_{iy}|}, \gamma = \arccos\frac{H_i \cdot n_{iz}}{|H_i||n_{iz}|};$$

and step 4, repeating step 2 and step 3, and obtaining S×N sets of azimuth angles information based on S-th three-axis electromagnetic sensors in the three-axis electromagnetic sensor array and N sets of magnetic field vector variable parameters, and determining damage area by using particle swarm genetic hybrid optimization algorithm.

In some embodiments, a direction-finding and positioning system of electromagnetic emission of coal or rock fracture is provided by the present disclosure, which constructs an array through a plurality of three-axis electromagnetic sensor based on tunnel magneto resistance effect to realize direction-finding and positioning calculations and a three-dimensional dynamic visual display to positioning results. The three-axis electromagnetic sensor changes the traditional coil-wound magnetic rod antenna structure, and selects a magnetic multilayer film material to induce electromagnetic emission induced by damage and fracture of coal or rock, and integrates sensitive elements and conversion elements inside the sensor to directly convert the magnetic field strength to voltage and output to the waveform conditioning module to suppress noise and amplify the effective frequency band signal, so as to realize the synchronous and accurate sensing of three-axis electromagnetic signal in the ULF~VLF frequency band, there is no need to connect an additional signal amplifier during using, which further improves the convenience of non-contact positioning monitoring.

BRIEF DESCRIPTION OF THE DRAWINGS

In order to explain the technical solutions in the embodiments of the present disclosure more clearly, the following will briefly introduce the drawings used in the description of the embodiments, obviously, the drawings in the following description are only some embodiments of the present disclosure, for those of ordinary skill in the art, other drawings can be obtained based on these drawings without creative work.

DETAILED DESCRIPTION OF THE EMBODIMENTS

In order to make the objectives, technical solutions, and advantages of the present disclosure clearer, the embodiments of the present disclosure will be described in further detail below in conjunction with the accompanying drawings.

Figure 1:
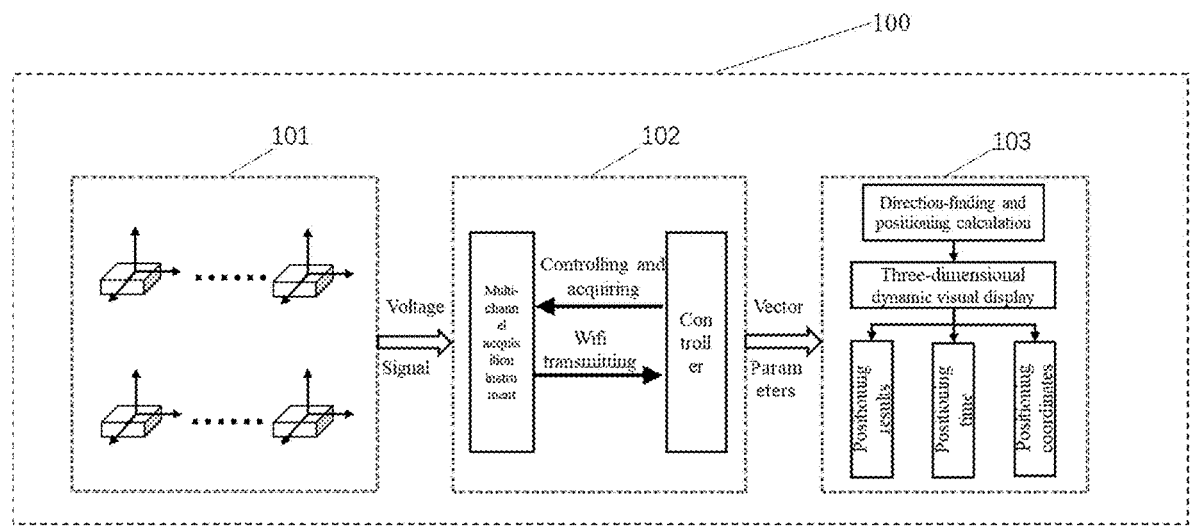
FIG. 1 is a schematic structural diagram of a direction-finding and positioning system of electromagnetic emission of coal or rock fracture provided by an embodiment of the present disclosure.

The embodiment of the present disclosure provides a direction-finding and positioning system of electromagnetic emission of coal or rock fracture 100, as shown in FIG. 1, the system 100 includes: a three-axis electromagnetic sensor array 101, a signal acquisition module 102 and a direction-finding and positioning terminal 103;

the three-axis electromagnetic sensor array is composed of at least four three-axis electromagnetic sensors, which are configured to synchronously sense magnetic field strength in three-axis direction based on a tunnel magneto resistance technology, and obtain a real magnetic field vector in space by measuring;

the signal acquisition module is configured to acquire magnetic field vector variable information of multiple measuring points in real-time, and after extracting magnetic field vector variable parameters, transmitting the magnetic field vector variable parameters to the direction-finding and positioning terminal;

the signal acquisition module includes a multi-channel acquisition instrument and a controller; the multi-channel acquisition instrument is configured to acquire the magnetic field vector change information of multiple measuring points in real-time, and transmitting acquisition data to the controller via WIFI wirelessly; the controller is configured to control acquisition process and store data, and transmit magnetic field vector variable parameters to the direction-finding and positioning terminal after extracting the magnetic field vector variable parameters;

the direction-finding and positioning terminal is configured to perform direction-finding and positioning calculations according to the magnetic field vector variable parameters that received, and performing a three-dimensional dynamic visual display to positioning results, positioning time, and positioning coordinates.

Figure 2A:
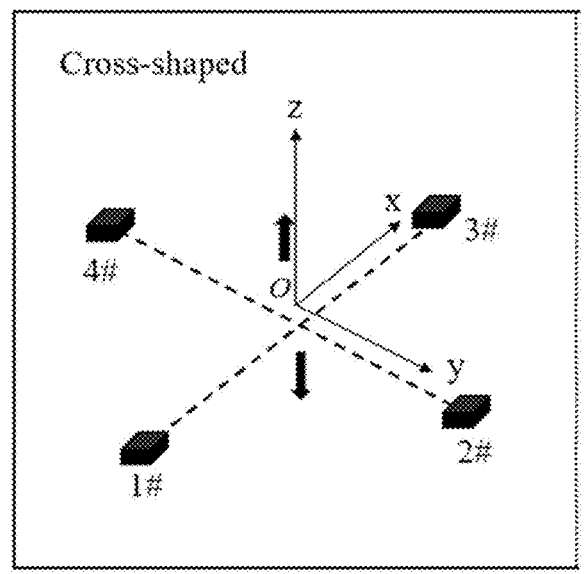
FIG. 2A is a schematic diagrams of array forms that formed by the three-axis electromagnetic sensor provided by the embodiment of the present disclosure.
Figure 2B:
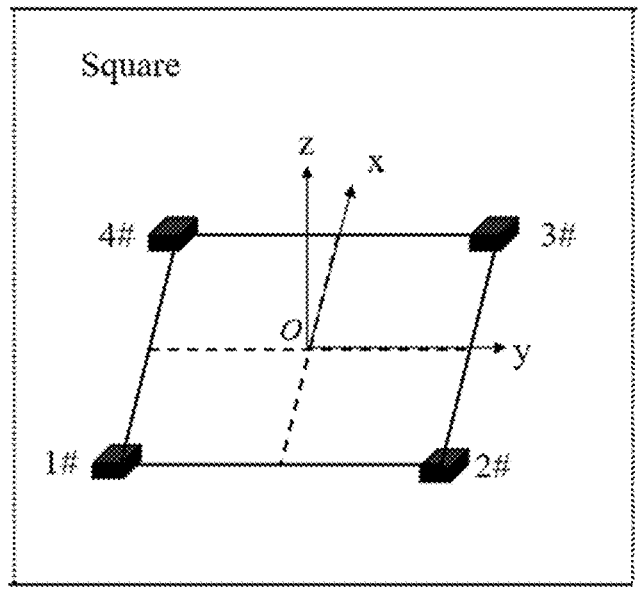
FIG. 2B is a schematic diagrams of array forms that formed by the three-axis electromagnetic sensor provided by another embodiment of the present disclosure.
Figure 2C:
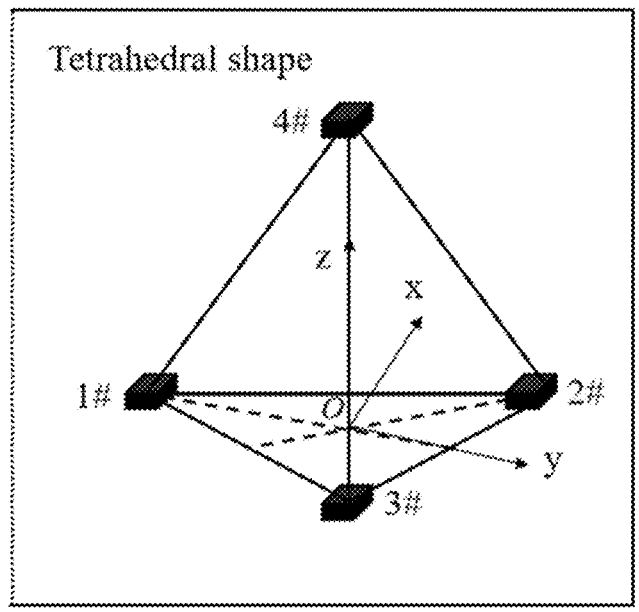
FIG. 2C is a schematic diagrams of array forms that formed by the three-axis electromagnetic sensor provided by further another embodiment of the present disclosure.

In some embodiments, process of the on-site implementation of a direction-finding and positioning system of electromagnetic emission of coal or rock fracture is as follows:

Selecting a working face that needs to be monitored when using, and arranging two sets of three-axis electromagnetic sensor arrays in the track lane and belt transportation lane of the working face respectively, the two sets of three-axis electromagnetic sensor arrays in the same roadway are separated by more than 50 m. There are multiple arrangement way for a single group of three-axis electromagnetic sensor arrays, taking four three-axis electromagnetic sensors as an example, the array forms that can be formed are shown from FIG. 2A to FIG. 2C, including cross-shaped, square, and tetrahedral shapes to meet different monitoring areas demand. The shape of three-axis electromagnetic sensor is square, which is easy to assemble, after determining the array form and measuring point position, using engineering tripod and fixture to fix the height of three-axis electromagnetic sensor, then adjusting sensor angle by using the spirit level, so that one end of the three-axis electromagnetic sensor remains level. After the array is built, controller can start signal acquisition, monitoring electromagnetic emission signals of coal or rock fracture in real-time, and realizing three-dimensional dynamic visualization of the direction-finding and positioning results at the direction-finding and positioning terminal.

Figure 3:
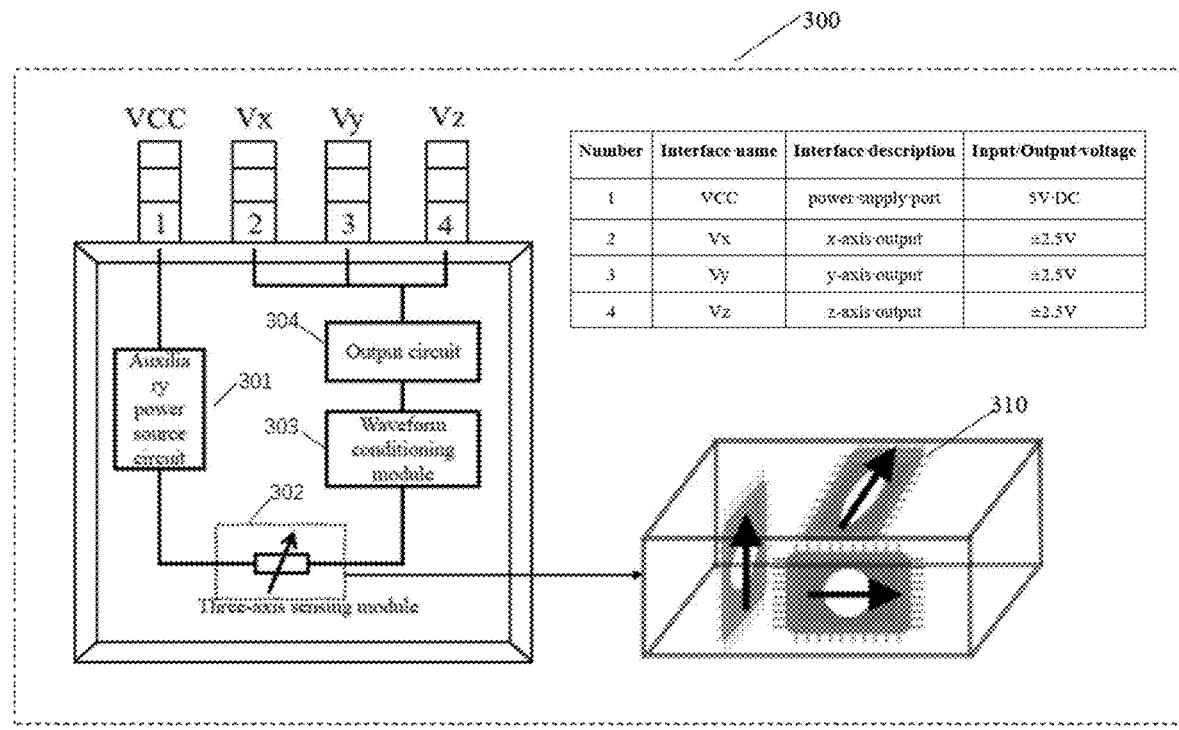
FIG. 3 is a schematic diagram of an internal structure of a single three-axis electromagnetic sensor provided by an embodiment of the present disclosure.

In some embodiments, the internal structure of a single three-axis electromagnetic sensor 300 is shown in FIG. 3, including an auxiliary power source circuit 301, a three-axis sensing module 302, a waveform conditioning module 303, and an output circuit 304 that are connected sequentially, the auxiliary power source circuit is connected to a power supply port, and the output circuit is connected to an axial output channel of the x-axis, y-axis, and z-axis respectively.

The three-axis sensing module 302 is composed of three micro-magnetic sensing chips arranged orthogonally through imposing by PCB patch, the micro-magnetic sensing chip 310 senses the magnetic field intensity components on the x-axis, y-axis, and z-axis based on the tunnel magneto resistance effect of magnetic multilayer film material, and a voltage signal conversion is realized directly through a push-pull Wheatstone bridge circuit. The direction of arrow in FIG. 3 is the direction of chip's magnetic sensitivity, when magnetic field and direction of the magnetic sensitivity are the same, a positive voltage is output, and on the contrary, a negative voltage is output. The sensing sensitivity is 60-150 mV/V/GS, the background noise is 150-200 pT/rtHz@1 Hz, and the range is ±0.03 Oe. The waveform conditioning module is configured to amplify signals of effective frequency bands, and filter signals of other frequency bands, a bandwidth of filter is from 200 Hz to 300 kHz. The processed signal is output to the x, y, and z channels through the output circuit.

Figure 4:
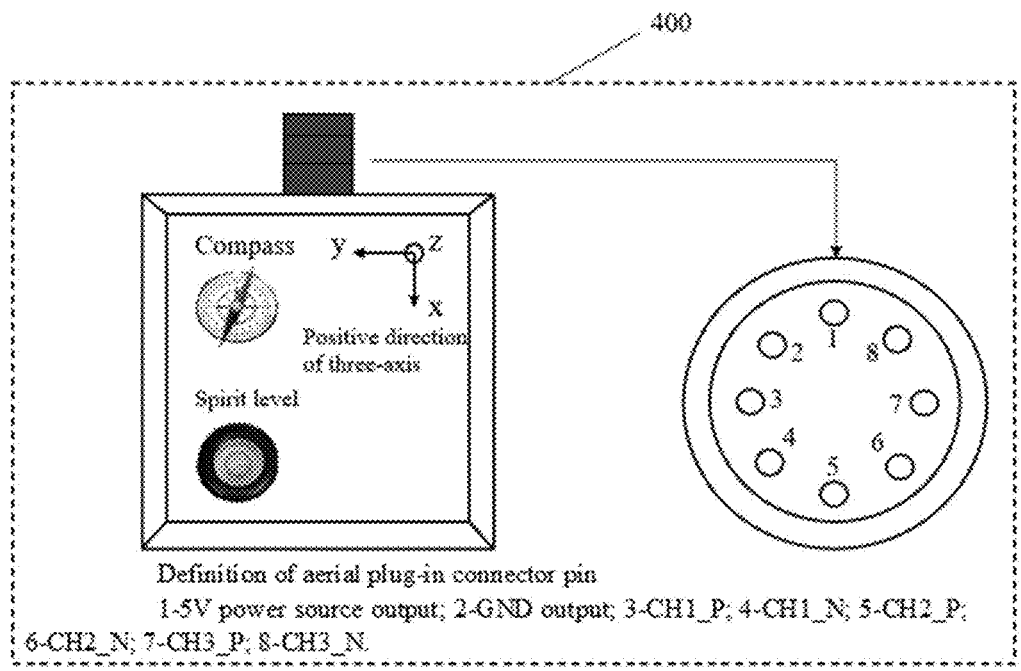
FIG. 4 is a schematic diagram of encapsulation of an aerial plug-in type three-axis electromagnetic sensor provided by an embodiment of the present disclosure.

In some embodiments, external structure of the three-axis electromagnetic sensor comprises a power supply and output end and an encapsulation shell, and the power supply and output end comprises a single-ended output type and an aerial plug-in type of two forms. As shown in FIG. 3, it is a schematic diagram of the power supply and output end of single-ended output type three-axis electromagnetic sensor, including a power source interface and an x-axis signal output interface, a y-axis signal output interface, and a z-axis signal output interface, the power source interface and the x-axis signal output interface, the y-axis signal output interface, and the z-axis signal output interfaces are all configured to adopt SMA interface, four pins are connected independently, and the range of linear output voltage is ±2.5 V. FIG. 4 is a schematic diagram of the power supply and output end of an aerial plug-in type three-axis electromagnetic sensor 400, including eight pins, one is connected to a power source, one is grounded, and remaining six pins output x-axis, y-axis and z-axis signals differentially, and the output range of each differential line is from 0 to 4.096 V.

The encapsulation shell is made of high-strength engineering plastics, positive directions of the three test axes are shown in FIG. 4. In addition to the direction marks, the encapsulation shell is inlaid with a spirit level and a compass so as to correct level and direction of the three-axis electromagnetic sensor when using. The power supply mode of the three-axis electromagnetic sensor includes built-in battery and external power supply, power supply voltage is 5V DC.

In some embodiments, the direction-finding and positioning terminal performs direction-finding and positioning calculations through the following steps:

step 1, establishing an unified Cartesian coordinate system, coordinate axis is parallel to test axis of each three-axis electromagnetic sensor, and correcting the corresponding relationship respectively between positive direction of each axis of the three-axis electromagnetic sensor and positive direction of the coordinate axis;

step 2, for the i-th three-axis electromagnetic sensor in the three-axis electromagnetic sensor array, constructing a space vector $n_{ix}$, $n_{iy}$, $n_{iz}$ along planes of the three coordinate axis according to spatial position of measuring point where it is located, and constructing a feature vector according to a set of magnetic field vector variable parameters $(A_x, A_y, A_z)$ extracted;

step 3, calculating three azimuth angles $\alpha$, $\beta$, $\gamma$ of the magnetic field vector at the position of the i-th third three-axis electromagnetic sensor:

$$\alpha = \arccos\frac{H_i \cdot n_{ix}}{|H_i||n_{ix}|}, \beta = \arccos\frac{H_i \cdot n_{iy}}{|H_i||n_{iy}|}, \gamma = \arccos\frac{H_i \cdot n_{iz}}{|H_i||n_{iz}|};$$

step 4, repeating step 2 and step 3, and obtaining S×N sets of azimuth angles information based on S-th three-axis electromagnetic sensors in the three-axis electromagnetic sensor array and N sets of magnetic field vector variable parameters, and determining damage area by using particle swarm genetic hybrid optimization algorithm.

In summary, a direction-finding and positioning system of electromagnetic emission of coal or rock fracture is provided by the present disclosure, which constructs an array of through a plurality of three-axis electromagnetic sensor based on tunnel magneto resistance effect to realize direction-finding and positioning calculations and a three-dimensional dynamic visual display to positioning results. The three-axis electromagnetic sensor changes the traditional coil-wound magnetic rod antenna structure, and selects a magnetic multilayer film material to induce electromagnetic emission induced by damage and fracture of coal or rock, and integrates sensitive elements and conversion elements inside the sensor to directly convert the magnetic field strength to voltage and output to the waveform conditioning module, and suppress noise and amplify the effective frequency band signal, so as to realize the synchronous and accurate sensing of the three-axis electromagnetic signal in the ULF~VLF frequency band, There is no need to connect an additional signal amplifier during using, which In some embodiments improves the convenience of non-contact positioning monitoring.

The above are only the preferred embodiments of the present disclosure and are not intended to limit the present disclosure, any modification, equivalent replacement, improvement, etc. made within the spirit and principle of the present disclosure shall be included in the protection range of the present disclosure.

What is claimed is:

1. A direction-finding and positioning system of an electromagnetic emission of a coal or rock fracture, comprising a three-axis electromagnetic sensor array, a signal acquisition module and a direction-finding and positioning terminal;

the three-axis electromagnetic sensor array is composed of at least four three-axis electromagnetic sensors, which are configured to synchronously sense a magnetic field strength in a three-axis direction based on a tunnel magneto resistance technology, and obtain a real magnetic field vector in space by measuring the magnetic field strength in the three axis direction;

the three-axis electromagnetic sensor comprises an auxiliary power source circuit, a three-axis sensing module, a waveform conditioning module, and an output circuit that are connected sequentially, the auxiliary power source circuit is connected to a power supply port, and the output circuit is connected to an axial output channel of the an x-axis, a y-axis, and a z-axis respectively;

the three-axis sensing module is composed of three micro-magnetic sensing chips arranged orthogonally through imposing by a PCB patch, the micro-magnetic sensing chip senses the magnetic field intensity components on the x-axis, the y-axis, and the z-axis based on a tunnel magneto resistance effect of a magnetic multilayer film material, and a voltage signal conversion is realized directly through a push-pull Wheatstone bridge circuit;

the signal acquisition module is configured to acquire magnetic field vector variable information of multiple measuring points in real-time, and after extracting magnetic field vector variable parameters, transmit the magnetic field vector variable parameters to the direction-finding and positioning terminal; and the signal acquisition module comprises a multi-channel acquisition instrument and a controller;

the multi-channel acquisition instrument is configured to acquire the magnetic field vector variable information of the multiple measuring points in real-time, and transmitting acquisition data to the controller via wireless fidelity; and the controller is configured to control an acquisition process and store data, and transmit the magnetic field vector variable parameters to the direction-finding and positioning terminal after extracting the magnetic field vector variable parameters;

the direction-finding and positioning terminal is configured to perform direction-finding and positioning calculations according to the magnetic field vector variable parameters received, and perform a three-dimensional dynamic visual display to positioning results, positioning time, and positioning coordinates;

the direction-finding and positioning terminal is further configured to:

step 1, establish an unified Cartesian coordinate system, a coordinate axis is parallel to a test axis of each three-axis electromagnetic sensor, and correct a corresponding relationship respectively between a positive direction of the three-axis electromagnetic sensor and a positive direction of the coordinate axis;

step 2, for an i-th three-axis electromagnetic sensor in the three-axis electromagnetic sensor array, construct a space vector $n_{ix}$, $n_{iy}$, and $n_{iz}$ along planes of three coordinate axes according to a spatial position of a measuring point where it is located, and construct a feature vector Hi according to a set of the magnetic field vector variable parameters (Ax, Ay, Az) extracted;

step 3, calculate three azimuth angles α, β, and γ of the real magnetic field vector at the position of the i-th third three-axis electromagnetic sensor:

$$\alpha = \arccos\frac{H_i \cdot n_{ix}}{|H_i||n_{ix}|}, \beta = \arccos\frac{H_i \cdot n_{iy}}{|H_i||n_{iy}|}, \gamma = \arccos\frac{H_i \cdot n_{iz}}{|H_i||n_{iz}|};$$

and step 4, repeat step 2 and step 3, and obtain S×N sets of azimuth angles information based on S three-axis electromagnetic sensors in the three-axis electromagnetic sensor array and N sets of magnetic field vector variable parameters, and determine a damage area by using a particle swarm genetic hybrid optimization algorithm.

2. The direction-finding and positioning system of the electromagnetic emission of the coal or rock fracture of claim 1, wherein the waveform conditioning module is configured to amplify signals of effective frequency bands, and filter signals of other frequency bands, a bandwidth of filtering is from 200 Hz to 300k Hz.

3. The direction-finding and positioning system of the electromagnetic emission of the coal or rock fracture of claim 1, wherein external structure of the three-axis electromagnetic sensor comprises a power supply and output end and an encapsulation shell, and the power supply and output end comprises a single-ended output type and an aerial plug-in type of two forms, the encapsulation shell is made of high-strength engineering plastics, and the encapsulation shell is inlaid with a spirit level and a compass.

4. The direction-finding and positioning system of the electromagnetic emission of the coal or rock fracture of claim 3, wherein the power supply and output end of a single-ended output type three-axis electromagnetic sensor comprises a power source interface and an x-axis signal output interface, a y-axis signal output interface, and a z-axis signal output interface, the power source interface and the x-axis signal output interface, the y-axis signal output interface, and the z-axis signal output interfaces are all configured to adopt an SMA interface, four pins are connected independently, and a range of a linear output voltage is +2.5 V.

5. The direction-finding and positioning system of the electromagnetic emission of the coal or rock fracture of claim 3, wherein the power supply and output end of an aerial plug-in type three-axis electromagnetic sensor comprises eight pins, one pin is connected to a power source, one pin is grounded, and remaining six pins output x-axis, y-axis and z-axis signals differentially, and an output range of each differential line is from 0 to 4.096 V.

* * * * *